US010234961B2

United States Patent
Balint

(10) Patent No.: US 10,234,961 B2
(45) Date of Patent: Mar. 19, 2019

(54) METHOD AND DATA ENTRY DEVICE FOR THE ENTRY OF DATA IN ELECTRICAL FORM

(71) Applicant: Geza Balint, Dunavarsany (HU)

(72) Inventor: Geza Balint, Dunavarsany (HU)

( * ) Notice: Subject to any disclaimer, the term of this patent is extended or adjusted under 35 U.S.C. 154(b) by 0 days.

(21) Appl. No.: 15/569,010

(22) PCT Filed: Nov. 5, 2015

(86) PCT No.: PCT/HU2015/050015
§ 371 (c)(1),
(2) Date: Oct. 24, 2017

(87) PCT Pub. No.: WO2016/170374
PCT Pub. Date: Oct. 27, 2016

(65) Prior Publication Data
US 2018/0129299 A1 May 10, 2018

(30) Foreign Application Priority Data

Apr. 24, 2015 (HU) ..................................... 1500189

(51) Int. Cl.
*G06F 3/041* (2006.01)
*G06F 3/023* (2006.01)
(Continued)

(52) U.S. Cl.
CPC ............ *G06F 3/0234* (2013.01); *G06F 3/016* (2013.01); *G06F 3/017* (2013.01); *G06F 3/0338* (2013.01);
(Continued)

(58) Field of Classification Search
CPC ........ G06F 3/016; G06F 3/017; G06F 3/0234; G06F 3/0338; G06F 3/03543; G06F 3/041; H04M 1/0202
See application file for complete search history.

(56) References Cited

U.S. PATENT DOCUMENTS

| 2009/0051659 A1* | 2/2009 | Mickelborough | .... G06F 3/0219 345/173 |
| 2009/0135142 A1* | 5/2009 | Fu | .......................... G06F 3/016 345/168 |
| 2009/0201248 A1* | 8/2009 | Negulescu | .............. G06F 3/016 345/157 |

* cited by examiner

*Primary Examiner* — Insa Sadio
(74) *Attorney, Agent, or Firm* — Anthony H. Handal; Handal & Morofsky

(57) ABSTRACT

Method for the conversion of elementary finger movements and/or movement combinations of a user into respective characters and/or functions presented as electrical signals by using a hand held smart electronic including the steps of: —associating a group of the movements and movement combinations with respective ones of characters and/or functions prior to the beginning of the conversion step so that the movements take place in a region defined by a closed boundary line; —in the associating step defining a predetermined number of special positions along the boundary line of the permitted region of movement; —entering the required characters and/or functions in a consecutive sequence further including the steps of: —holding the device in a hand so that a free finger touches an upper surface thereof; —moving the finger according to the movements or movement combinations associated with the character or function to be entered; —providing haptic feedback to the user when the boundary line and any of the special positions has been reached; —following the termination of the entry of a character or function slightly raising the finger, —detecting the finger raising step and carrying out the conversion of the previously entered movement combination into the associated character or function, —repeating the entering steps as long as all required characters or functions have been entered and converted.

13 Claims, 8 Drawing Sheets

(51) Int. Cl.
*G06F 3/01* (2006.01)
*G06F 3/0338* (2013.01)
*G06F 3/0354* (2013.01)
*H04M 1/02* (2006.01)

(52) U.S. Cl.
CPC .......... *G06F 3/03543* (2013.01); *G06F 3/041* (2013.01); *H04M 1/0202* (2013.01)

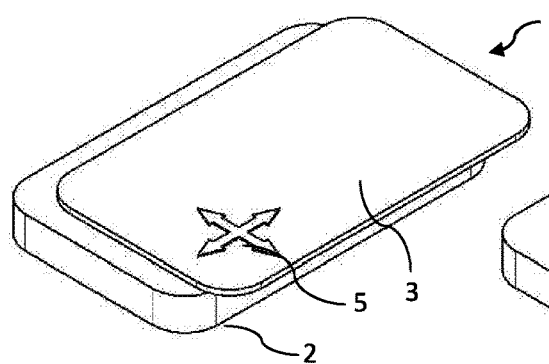
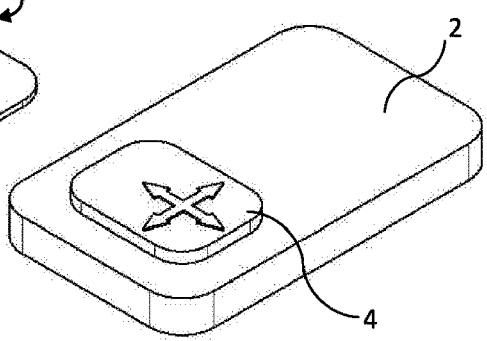
Fig. 1      Fig. 2
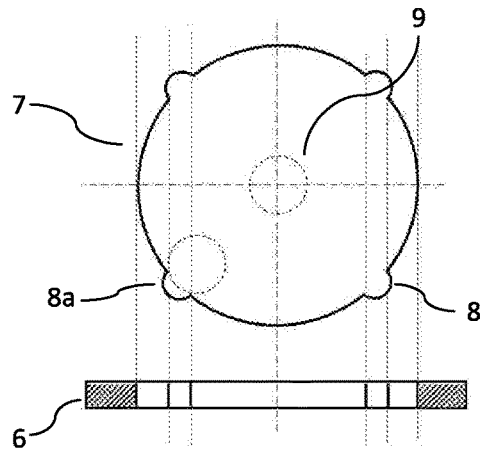
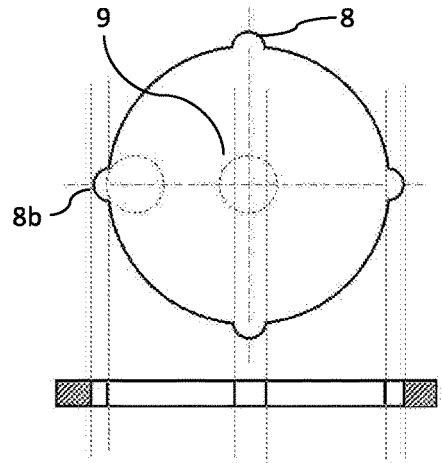
Fig. 3      Fig. 4
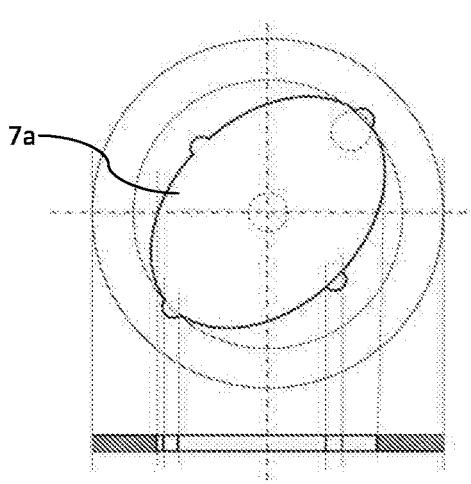
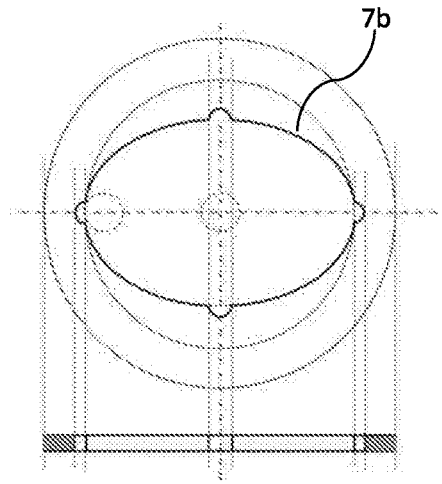
Fig. 5      Fig. 6

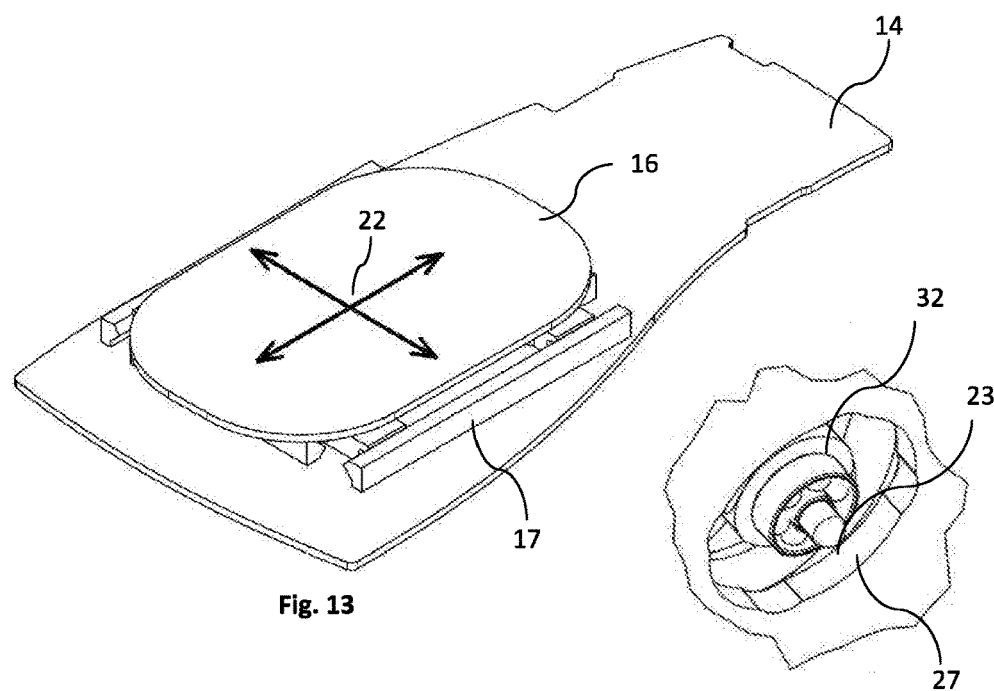
Fig. 13
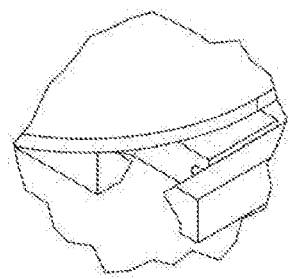
Fig. 14
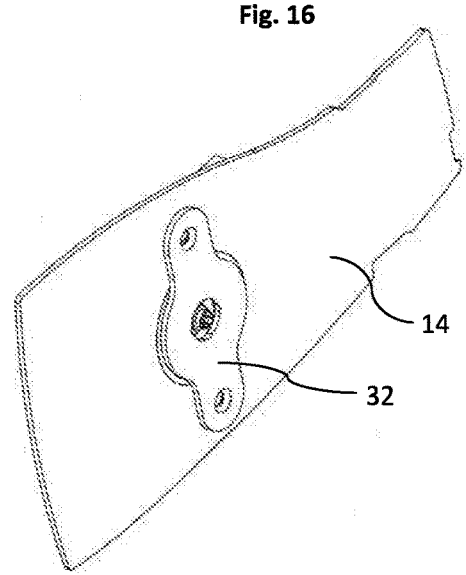
Fig. 16
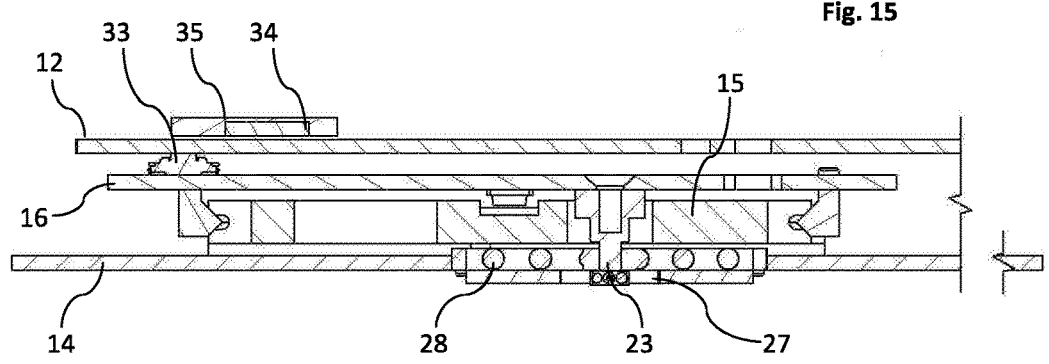
Fig. 15
Fig. 17

METHOD AND DATA ENTRY DEVICE FOR THE ENTRY OF DATA IN ELECTRICAL FORM

The invention relates to a method for the conversion of elementary finger or thumb movements and/or movement combinations into respective characters and/or functions presented in the form of electrical signals by using a hand held device.

The invention relates also to a data entry device for carrying out the method.

A large number of different data entry methods and devices are known which can be divided into several groups according to the basic principle of operation. The first and perhaps the more generally used type uses direct character entry and it includes a keyboard having a predetermined number of keys associated with different characters, and the pushing of a key generates data corresponding to the character or function associated with that key. The number of the keys is generally less than the number of characters/signals/commands that should be defined, therefore keyboards comprise function keys or certain functions can be activated with specific key combinations. In telephones the numbers are specialty arranged in 3 columns and 4 rows, and by the repeated pressure of a number up to three different letters can be entered. Such keyboards are generally referred to as ITU-T keyboards. The size of the keyboards fits to the size of human hands and fingers, thus their use is preferred from ergonomic aspects. It is their drawback, however, that they could not follow the tendency of miniaturization of electronic devices, and with decreased sizes their use is limited or it is uncomfortable.

In several ones of recent electronic devices, primarily in mobile phones and tablets, especially which are equipped with a touch screen a virtual keyboard is displayed when there is a need for data entry, and the actual data entry occurs similar to conventional keyboards by selection among the displayed keys represented by respective fields, in which the selected key should be touched by a finger or a pen. One drawback of such electronic keyboards lies in that in use a part of the valuable screen surface is occupied by the virtual keyboard. A further drawback is that if the area available for the keyboard is small, the finding of the fields associated with the respective keys will become more difficult that increases the likelihood of entry errors and increases also the time required for selecting a key, and it is at the same time uncomfortable, especially if the task is the writing of longer texts. The use of a special pen could only partially reduce these problems, since their tips take much smaller area than fingers. The human eyes get soon tired if they have to watch smaller areas and have to choose between the displayed miniature characters.

A further group of data entry devices utilize the principle of selection and utilizes the function of a mouse, namely the characters are not directly entered as in case of the first group, but the user watches a screen in which multiple characters are displayed, and selects the required one by pointing to the associated field and clicking then with the mouse. This method has the drawback that the plurality of possible choices has to be displayed on a screen and the choice must be made among them. The display takes a part from the valuable display field, and the choice between several fields gets more time consuming and tiring when the number of displayed fields increases. Character entry with a mouse and with such selection is preferred only in case of shorter messages. A further issue lies in that a mouse can be used in a convenient and comfortable way only if its size fits to the size of the hand, and there is an available plane surface along which the mouse can be moved. Miniature devices are known that can be moved in a plane along two coordinates and the movement is followed by a cursor or a marking on a screen, and the selection occurs by pushing the device normal to the plane of movement. Such a device is described e.g. in EP0422361 B1.

Data entry by selections that is similar to the function of the mouse can be found in most remote controllers of electronic entertainment devices, in which four arrows are placed on the device each is associated with a respective direction, by which the required one of the displayed fields can be reached in a stepwise manner, and the selection requires pushing of an OK button. In spite of their wide commercial use, such entry devices are slow and not comfortable, furthermore the data entry required for internet use is also slow, discomfortable and tiring. Their application can be justifiable only if they have to be used infrequently and choosing between few characters/functions.

The combination of the first and second mentioned groups can be learned from US 2009/00094, in which for preventing the use of valuable screen areas a moving element (plate) is placed under the screen that is provided with projections and can be moved by two thumbs, and the selection of the respective characters or functions is made by the tilting of the moving element in one of the four possible directions, then validate the selection by pushing the element. By using a feedback by touch sensation the plates can be moved in several discrete positions, and to each position a separate character table is associated. The entry is facilitated by the display of the corresponding table on the screen. This device requires the operation with two hands, and the movement of two plates into the required discrete position needs increased attention, and this use is hard to be learned.

A third group of data entry devices also uses direct data entry, in which the user writes the text with normal handwriting by a pen on a touch screen, and certain simplified versions are also known in which the most frequently used characters or commands can be selected by simple gestures. In such devices the screen takes the function of a "blank paper", and it has the drawback that it takes all or a major part of the available display area, whereas the writing of the characters in a small area is not really efficient, finally the recognition of hand writing is not perfect and errors often occur.

In the publication WO2010/149225 an improved data entry method is disclosed which can be regarded as an improvement of the ITU-T keyboard, wherein instead of pressing the respective keys, a virtual ITU-T keyboard was reproduced on an area comprising an arrangement of touch-sensitive fields and isles between them which are not touch sensitive. The document suggested the movement of a finger or of a stylus along the area according to preset rules, and a processor observed subsequent activation of the touch sensitive fields and compared the sensed combinations with a pre-stored table of characters associated with respective possible combinations. The association of the elementary finger movements or gestures how the respective touch sensitive segmented areas had to be touched with the respective characters-function followed in a simplified sense the shape of the respective characters. The user had to learn to write in this way. When using this method the user was relieved from the need of pressing the same key several times as it was the case at ITU-T keyboards, in order to make the distinction between active and passive fields easier the height of active and passive fields were different therefore when the user moved his finger according to the required pattern a haptic feedback assisted his orientation. This method was an improvement of several other similar attempts published e.g. in US2004070569, US2005088415 and US20090135142.

Although making gestures is easier than pressing targeted fields, the suggested way of using gestures has drawbacks, as the gestures follow the arrangement of the ITU-T keys, and the presence of an array of distinct touch sensitive (active) and inactive fields is difficult to make and their signals to process. The size of such fields cannot be decreased under a certain minimum, otherwise it would be difficult to find them therefore a rather large surface area is required for using all the 12 touch sensitive fields of this data entry system. Finally, the haptic feedback that assists recognizing the respective separate touch sensitive areas does not provide orientation for the user concerning the actual position of the finger in the array as it only signals the boundaries of the active and inactive fields.

The object of the invention is to provide a data entry method and a device of the direct data entry type i.e. by which the required characters or functions can be entered in a direct way (i.e. not by using any selection) in a hand held device that requires only a small region of finger movement which is available even at the smallest smart devices and which does not require the occupation of a noticeable part of the screen or it also works without a screen and wherein the user can easily learn the association between the rules of association of the characters/function with the required movement combination and a haptic feedback assists in the orientation of the finger in the data entry field.

For solving this object I have recognized that one can easily hold a flat object placed between the thumb and the forefinger or between the thumb and the other fingers, furthermore if the thumb or the forefinger is moved within a small region according to a previously learned and exercised coded system of elementary movements and movement combinations, then by using conventional sensors that convert finger movements into electrical signals, a direct data entry can be provided. For the sake of simplicity the term "finger" used in the present specification covers both fingers and the thumb. The learning of the movement combinations and the actual use of the combinations is facilitated and entry errors are minimized if a haptic feedback is associated with the finger movements, more particularly when the finger reaches respective special locations. In this way a very sensitive and easy to handle data entry method is obtained that is not tiring for the user owing to the need of small movements only. Fingers are very sensitive to sense even the slightest touch, therefore if the special locations of the haptic feedback are chosen in an appropriate way then the use of character and data entry will be easy to learn and practice.

If the number of the required characters/functions increases over the number of the movement or gesture combinations that can be learned easily, then special gestures or separate designed areas on the surface of the device can be assigned to take the role of one or more function keys, by which a different code system can be assigned to the previously learned movement combinations. This is similar when we press in a conventional keyboard a function key and the characters will be replaced by numbers and commands, or a shift key changes between characters with lower or upper case.

A data entry device designed in the aforementioned way makes use of the fine nature of the haptic or touch sensation and fine movement of the fingers and creates thereby a new paradigm system that have yet unforeseeable data entry and utilization perspectives.

A drawback of this solution lies in, as it is the case in all new paradigm systems that one has to depart from conventional ways and has to learn something new, in the present case the gesture combinations. This is facilitated if the respective characters are associated with such combinations in a logical way, i.e. a character is associated with movement combinations that resemble writing the same character but in a greatly simplified manner. Furthermore when new paradigms with new tasks appear, one has to weigh the ratio of the associated advantages/drawbacks connected with learning the new system, and if the advantages outweigh the difficulties, it will be worthwhile to learn it.

As an analogy let us refer to shorthand writing. Before the wide use of smart electronic devices i.e. in the period when typewriting was the dominant way of writing, instead of the slow typewriting that also required a hard physical effort, shorthand writing was invented, learned and widely used. Shorthand writing also utilized the writing of simplified and cleverly abbreviated versions of characters and frequently used expressions, i.e. shorthand writing when expressed with a modern terminology is not else than a smart code system of gestures. To learn shorthand writing was a task that required a substantially higher human effort and learning than the suggested system, and in spite of such difficulties, through several decades millions of people learned and used it, and a few applications of shorthand writing is still in use.

For learning and using a kind of non-conventional combinations a further example can be mentioned, i.e. the Morse codes which have been in use since the beginning of telegraphy and which have been widely learned and used, although that job has been much more difficult than the use of the suggested gesture combinations.

As a further example reference can be made to Braille writing which is also a system that is more difficult to learn than the suggested gesture combinations, and in spite of its difficulty it is widely used.

The learning of the suggested gesture combinations is connected with a further advantage, namely blind and partially sighted subjects can learn it fast and easily, therefore such a data entry device will be appropriate also for their use.

According to a further recognition following the "writing" of the respective characters with a gesture combination and prior to the entry of the next character it is sufficient if the thumb or finger is slightly raised or the pressure is decreased, then the entry of the next character can be started. The validation of the entered characters by raising the finger is a substantial step forward compared to the previously referred conventional ways that copy the function of the mouse because it is much easier and less tiring to decrease pressure than the clicking or pushing of the device. A further advantage lies in that the clicking or pressing as a possible function will be available for additional uses independent from the entry of the characters, by which e.g. a command can be validated or a message displayed on the screen can be accepted.

The direct data entry by the use of elementary movement combinations can take place in one of two different ways In the first way an entry element placed on the outside of the hand held date entry device is moved by the finger relative to the body of the device, and the required path of movements and tactile feedback positions are solved by the special guiding of the entry element with respect to the body of the device.

In the second way there will be no moving element at all but a special surface region will be assigned to data entry, and in this region special projections and/or recesses are formed at predetermined special places that provide haptic feedback for the finger when touched, and the movement of the finger is sensed and converted into electric signals by touch sensors in the same way as in case of touch screens.

The invention is summarized in the attached claims.

The data entry device according to the invention will now be described in connection with examples in which reference will be made to the accompanying drawings. In the drawing:

FIG. 1 shows the perspective view of a preferred embodiment of the data entry device;

FIG. 2 is the perspective view of another embodiment;

FIGS. 3 to 6 show different realizations of the guiding path;

FIG. 13 shows the base plate 14 with the upper plate guided in two directions with respect thereto;

FIG. 14 is an enlarged detail of the indicated part of FIG. 13;

FIG. 15 shows the base plate 14;

FIG. 16 shows the guiding pin 23 as it is surrounded by the guiding path 27;

FIG. 17 shows the elevation sectional view of the entry device;

FIGS. 1 to 20 illustrate in detail the first mentioned way of data entry according to the invention, i.e. when a data entry element is moved with respect to the device.

Figure 7:
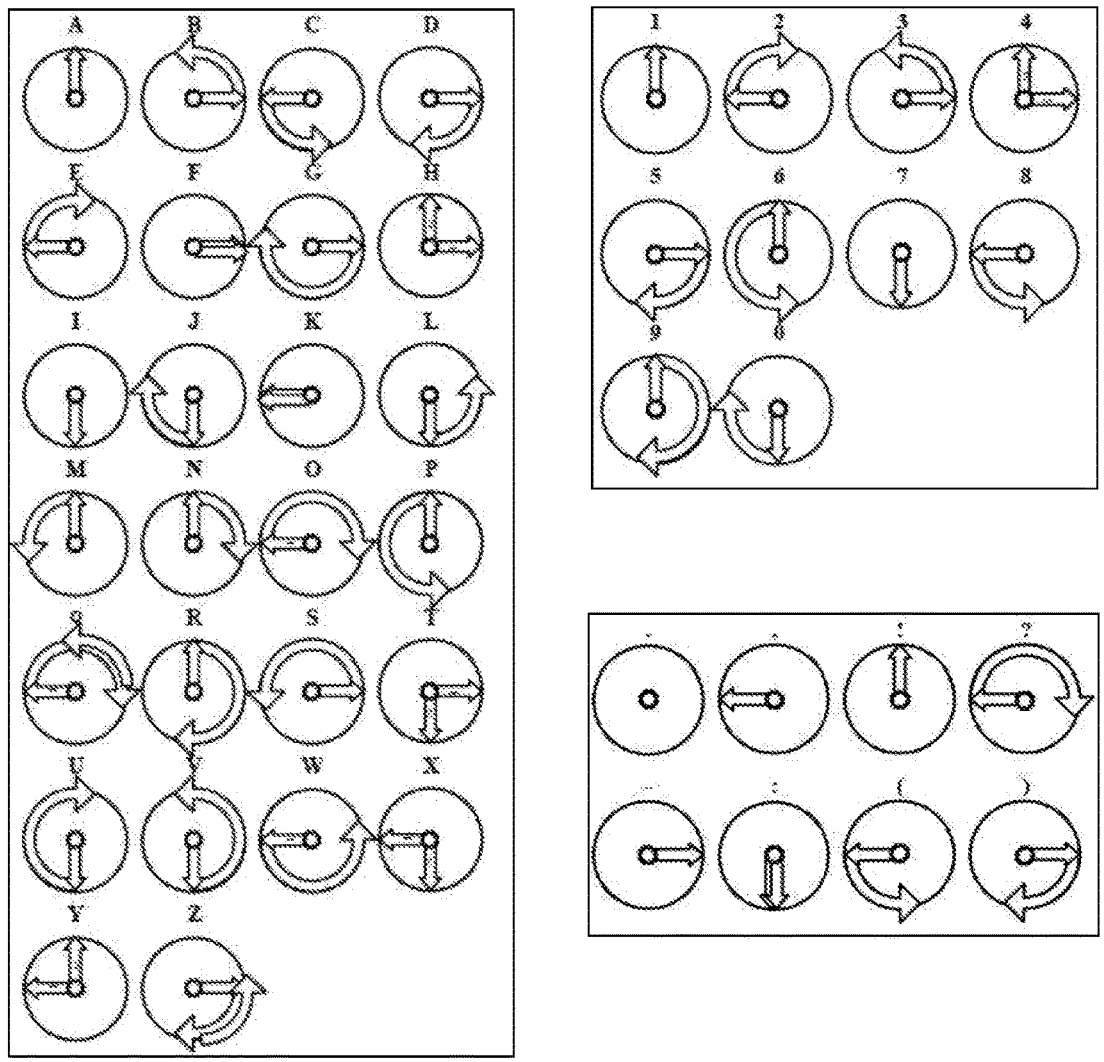
FIG. 7 shows an example for the association of displacement combinations to characters, numbers and commands.
Figure 8:
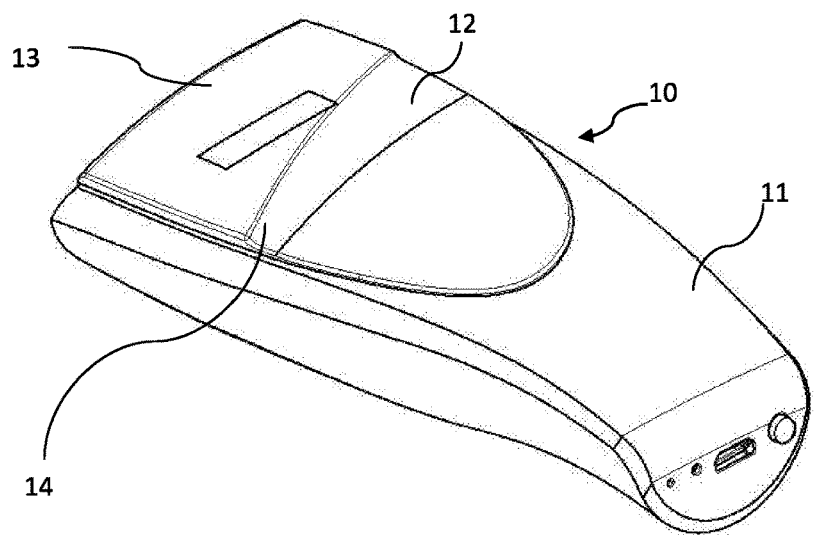
FIG. 8 is the perspective view of a self contained data entry device.

FIGS. 1 and 2 show schematically the data entry device 1 according to the invention that has a small, light weight and flat body 2 that can be held in a hand and has an entry element 3 or 4 positioned at the upper part of the body and can be moved relative thereto. The shape of the body 2 is similar to that of a mobile phone or to a remote controller of electronic entertainment devices but it can be even smaller than these objects. In a preferable embodiment the data entry device 1 can be built together or be combined with a mobile phone. The essence of the entry element 3 or 4 lies in that it can be freely moved along a predetermined surface within a given range relative to the body 2. The displacement has at least two degrees of freedom, namely it allows movement along two mutually normal axes (directions), but the rotation or turning the element is not possible. In the embodiment shown in FIG. 1 the entry element 3 is constituted by a touch screen that covers the whole upper face of the data entry device 1 (or a glass plate that covers the touch screen), and the entry element 3 can be moved freely along a double arrow 5. The movement can be controlled preferably by the thumb of the hand by which the device is held. The embodiment shown in FIG. 2 differs from this only in that the entry element 4 covers only a part of the face of the body 2, but it can be displaced in the same way relative to the body 2. In any position of the displacement the entry devices 3 or 4 cannot be turned i.e. the directions of the double arrow 5 remain unchanged.

The entry element 3 or 4 can preferably be moved in addition to the aforementioned displacement with two degrees of freedom also in a direction normal to the surface of movement against overcoming a bias pressure. With such a feature in addition to the data entry function to be described later further functions can be realized like clicking with a mouse or "line feed" or "enter" functions.

The displacement of the entry element 3 or 4 takes place along a closed curved line as a guiding path, and FIGS. 3 to 6 show examples to such movements. In FIGS. 3 and 4 a circular guiding path 7 is shown that has been cut out from plate 6, and in locations of the path closing degrees of 90° respective recesses 8 are provided, and in the embodiment of FIG. 3 the recesses 8 close respective angles of 45° with the main directions of displacement. In FIG. 4 the recesses 8 are located in these main directions. In the central region of the guiding path 7 a guiding pin 9 is provided and shown with dashed line which is fitted in a cut of the plate 6 that defines the guiding path 7. The entry element 3 or 4 shown in FIG. 1 or 2 as moving parts can be connected with the plate 6 in the case the position of the guiding pin 9 is fixed, or in an alternative embodiment the guiding pin 9 can be moved and it is guided along the cut of the plate 6. The essence lies in that the relative position of the plate 6 and the guiding pin 9 positioned in the cut of the plate 6 can be changed with the previously described movement with two degrees of freedom. Any one of the two alternatives can be chosen, but it has to be ensured that in a basic position when no pressure is applied on the entry element 3 or 4, the guiding pin 9 is brought by a biasing assembly (not shown) with a slight force to the central part of the guiding path 7 which is the position shown in the drawing.

When the entry element 3 or 4 is moved, the finger should overcome the slight resistance of the biasing assembly and the element 3 or 4 can be moved in any direction until the edge of the guiding path 7 is reached. After reaching the guiding path 7 the edge thereof will prevent further outward movement of the guiding pin 9 which can now be moved only along the guiding path 7. During such sliding movement when the guiding pin 9 reaches one of the recesses 8, it penetrates slightly therein and a slight resistance will be felt by the moving finger. During movement by a finger the reaching of the guiding path 7 also generates a touch sensation, and it is also felt when one of the recesses 8 has been reached, and this feeling provides a sufficient tactile feedback signal concerning the actual position of the finger along the guiding path 7. This feeling as a feedback is in accordance with the basic idea of the present invention, because the direction in which the central position has been left, the sliding guided movement along the path 7 and the slight resistance of the engagement in the recesses 8 generate a definite tactile information (sensation) that does not require the additional watching of the screen of the data entry device 1. In FIG. 3 the guiding pin 9 is shown in engagement in the south-west recess 8a, and in FIG. 4 in an engagement in the west recess 8b. The touch feeling is so fine that it can sense even a displacement of a few millimeters, therefore the size of the guiding path 7 can be chosen to be small, preferably smaller than 10 mm and more preferably to 4 to 6 mm, and making movements in such small ranges is not tiring but provides a sufficient feeling concerning the momentary position.

FIGS. 5 and 6 show elliptical guiding paths 7a and 7b and in FIG. 5 the recesses are at the ends of two normal axes that close 45° with the main axes, and in FIG. 6 the recesses fall in the end points of the two main axes.

The shape, direction and the position of the recesses 8 should be chosen in accordance with the form of the body 2 of the data entry device 1 so that the finger or thumb that controls the movements moves in the ergonomically most comfortable way. In the exemplary cases the number of the recesses 8 was four however, more recesses can also be created along the guiding path 7, whereas attention should be paid that the operator can well distinguish the respective recess positions from each other by his/her touch sensation.

For distinguishing the discrete positions along the guiding path 7 by touch sensation not only the use of recesses represent the only way, but any other construction can be used that can provide the required touch sensation as a tactile feedback when the position of the entry element during its guided movement reaches one of the predetermined special positions. This can be solved e.g. by miniature magnets placed close to such predetermined positions that works if the guiding pin 9 is made from a magnetizable material, or if under the plate 6 the bottom of the guiding pin 9 is supported by such a way that in these predetermined positions there are respective protrusions or recesses normal to the plane of the guiding path. From the point of view of the present invention it is important that the entry element should be moved from the central region of the guiding path in a well distinguishing direction to reach the path, and when movement is made along the path the element should be moved in a well distinguishable way to one or more ones of the predetermined special positions.

These elementary movements can be learned easily and by sufficient training they can become automatic, whereby each of such movement combinations can be associated with the respective characters of any given language. FIG. 7 shows an example in which way can the Latin alphabet, numbers and commands and the most important punctuation marks are associated by respective movement combinations. Because it is possible to associate any movement combination with different characters, i.e. instead of letters, numbers or punctuation marks, therefore on the data entry device 1 appropriate entry possibilities (not shown in the drawing) should be provided for the arrangement of such shift operations (being knobs or virtual sensing areas or other means). The association system shown in FIG. 7 is preferable because there movement combinations have been associated with the respective characters which resemble or are similar to the hand movements when writing such characters.

In case the data entry device 1 is used for the entry of characters, and the respective association have not yet become automatic, it can be preferred if a display is provided on the device (e.g. in FIG. 1 the whole entry device 3 can be such a display) on which the entered character can be displayed. This provides a control possibility for the entry and for the correction of any possible error.

For such a way of character entry it is supposed that following each entry (movement combination) the controlling finger be slightly lifted and it is allowed that the guiding pin 9 or the entry element 3 or 4 can move again in its basic position in the central region of the path.

The feedback based on touch sensation as a direct data entry is more preferred than any of the previously used ways of data entry, because there is no need that the character or data to be entered be defined by a selection operation using finger movements on a virtual keyboard, or using a mouse and watching a display. A further advantage of the entry by movement combinations based on the associated touch sensations lies in that it provides a solution also for blind persons or those with partial sight.

In FIGS. 8 to 17 a portable and hand held embodiment of the data entry device 1 according to the invention has been shown with its internal structural design, which can be used for data entry tasks. In the perspective view of FIG. 8 it can be seen that this data entry device 10 has a nicely designed body or housing 11 that can be held by one hand and the major part of its upper face is covered by a flat, arced entry element 12 which is e.g. a glass plate that can be moved with respect to the housing 11 along its own plane. On the entry element 12 a window 13 is provided, and a display (not shown) is arranged behind the window 13 that enables displaying the entered data or characters. On the housing 11 a plurality of control knobs 14a or touch-sensing areas can be provided which can serve for the selection of different data entry functions. Of course other ways can also be used for selecting the required function. The data entry device 10 is connected preferably with a wireless connection (in certain cases with wires) to the electronic device or apparatus controlled thereby.

Figure 9:
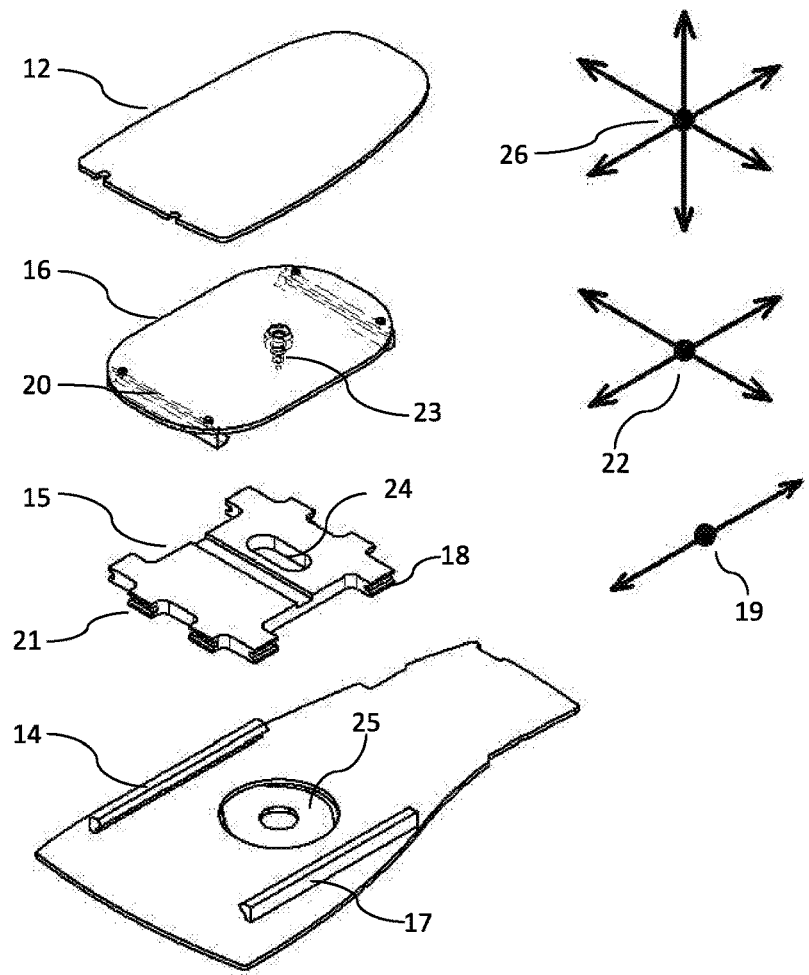
FIG. 9 is a schematic exploded view of the internal design of the device of FIG. 8.

FIG. 9 shows schematically the main parts of the data entry device 10 after the removal of the housing in an exploded view. Proceeding from downward above one can see a base plate 14 which is stationary relative to the housing 11, an intermediate plate 15 and an upper plate 16 that can be identical with the entry element 12 shown in FIG. 8 but it is constituted preferably as a separate element and it is rigidly connected with the entry element 12. The single or double arrows shown beside the respective elements illustrate the possible direction of movement of the associated element. On the base plate 14 at both sides respective guiding rails 17 are provided which extend in parallel to the longitudinal axis of the housing 11, and their task is the guiding of the intermediate plate 15. The intermediate plate 15 has a rectangular design and from its all four sides respective pairs of guiding elements 18 extend out which are parallel with the associated sides and comprise guiding slots, which extend also parallel to the associated sides. The slots of the two pairs of guiding elements 18 extend parallel to the guiding rails 17, and guide them for movement along the longitudinal axis. A double arrow 19 shown beside the intermediate plate 15 indicates that this intermediate plate 15 can be moved only by one degree of freedom in this longitudinal direction with respect to the stationary base plate 14.

At the bottom of the upper plate 16 transverse guiding rails 20 are provided which are not visible in FIG. 9 and fit in transverse guiding slots 21 provided in the transverse guiding elements of the intermediate plate 15 so that the guiding rails 20 are guided therein. In this way the upper plate 16 can be moved relative to the intermediate plate 15 only in transverse direction, but with respect to the stationary base plate 14 it can move both in longitudinal and transverse directions. This movement with two degrees of freedom is indicated by the quadratic arrow 22 beside the upper plate 16.

The assembly includes further a guiding pin 23 extending out from the lower side of the upper plate 16 in downward direction towards the base plate 14, and for this guiding pin 23 in the full region of movement an opening 24 is provided in the intermediate plate 15. The length of the guiding pin 23 is sufficient to reach bottom of a recess 25 made in the base plate, and this pin 23 takes the task of the guiding pin 9 shown in FIGS. 3 and 4, as it will be explained in detail. It is the entry element 12 which is moved by the thumb of the hand of the operator that holds the data entry device 10, and the element 12 is rigidly connected to the upper plate 16.

In accordance with the design described so far the structure comprising the entry element 12, the upper plate 16, the intermediate plate 15 and the base plate is fixed in the direction normal to said movements. The base plate 14 is arranged in the housing 11 in such a way (not shown in FIG. 9) that in the direction of its thickness i.e. which is normal to the plane of the movement it can be moved against a spring bias along a short path. This means that by pressing the entry element 12 a further new entry function can be realized if by this movement one or more micro switch is operated or the displacement in the depth direction is sensed in any other way. This additional degree of freedom is optional i.e. this is not inevitably required for the data entry according to the invention, whereas it offers a number of advantages. An arrow 26 that shows in six directions and indicated beside the entry element 12 indicates the possibility of the movement with three degrees of freedom.

Figure 12:
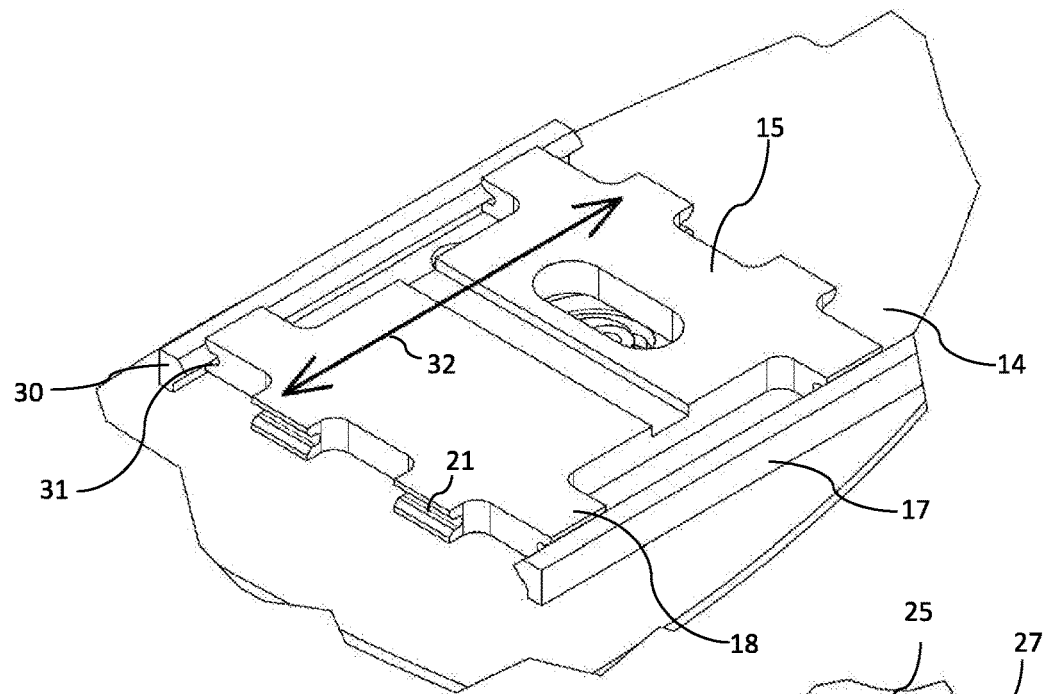
FIG. 12 shows the base plate 14 with the intermediate plate 15 placed thereon.
Figure 11:
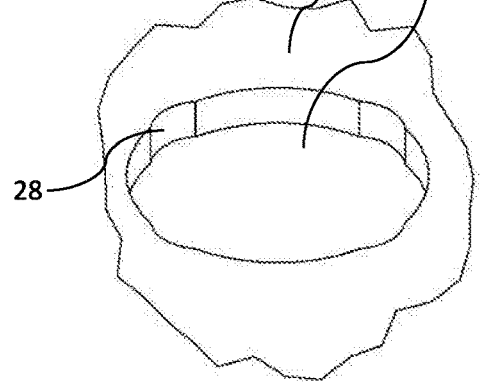
FIG. 11 is the enlarged perspective view of a detail of FIG. 10 that shows the guiding path 27.
Figure 10:
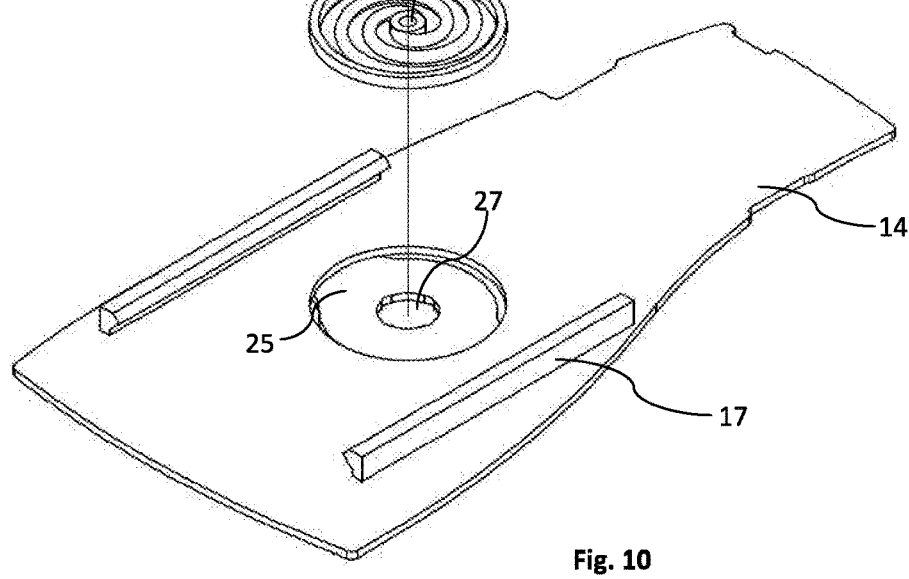
FIG. 10 is the schematic perspective view of the base plate 14 with the spring 29 above it.

Reference is made now to FIGS. 10 to 12 which show further details of the structure of the data entry device 10. FIG. 10 shows the enlarged view of the base plate 14, the two guiding rails 17 provided thereon and the recess 25. At the bottom of the recess 25 the guiding path 7 described in connection with FIGS. 3 to 6 is provided from the material of the base plate 14 that determines and limits the movement of the entry element 12. FIG. 11 shows the enlarged view of the bottom part of the recess 25 in which the shape of guiding path 27 can be better seen and this shows the identity with the previously described guiding path 7. The touch sensations are provided by recesses 28a arranged at particular portions of the path that provide the function of the previously described recesses 8. In assembled state the cylindrical surface of the guiding pin 23 abuts the guiding path 27, and this contact determines the displacement of the entry element 12 relative to the housing 11. In FIG. 10 above the recess 25 a flat spring 28 is shown which is located in assembled state in the recess 25 as in a nest, and it has a central opening 29 that fits to the diameter of the guiding pin 23, whereby it tends to keep the guiding pin 23 with the assembly attached thereto in the central region of the guiding path 27 or to return it thereto.

FIG. 12 shows in enlarged view the guiding of the intermediate plate 15 in longitudinal direction along the guiding rails 17 provided on the base plate 14. In the drawing it can be observed that the guiding rails 17 have an inwardly directed wedge shaped guiding profile 30, and the profile of slots 31 provided in the guiding element 18 of the intermediate plate 15 is the conforming negative one thereof. This stable guiding makes sure that the intermediate plate 15 can be moved in longitudinal direction easily but without any play along arrow 32a. This guiding prevents any rotation of the intermediate plate 15. FIG. 12 also shows the transversal guiding slot 21 of the intermediate plate 15 that has a profile similar to that of the slot 31. This guiding slot 21 has the task to guide the upper plate 16 placed thereon in transverse directions.

FIG. 13 shows the upper plate 16 and its ability of being moved in four directions as shown by the arrow 22. In this figure the intermediate plate 15 is covered but the in the enlarged detail of FIG. 14 shows how the guiding is provided along the wedge-profiled guiding rails and conforming slots.

FIG. 15 shows again the base plate 14, and in this embodiment a separate insert 32 covers the recess 25, and in the interior of the insert 32 there is sufficient space for locating the spring 28 and which definitely supports the guiding pin 23 inserted therein. FIG. 16 shows an enlarged detail that shows that the guiding pin 23 is positioned in the central part of the closed curved line of the guiding path 27, and the guiding pin 23 is supported at its outer surface by a definite bearing.

FIG. 17 shows the cross section of the data entry device 10 in which the spatial arrangement of the elements described earlier can be seen. In the embodiment of FIG. 17 the uppermost plate constitutes the entry element 12 and a guiding normal to the plane of the movement is provided between this uppermost plate and the upper plate 16, and for the previously mentioned control in depth direction (operated by pushing the entry element 12) a micro switch 33 is provided which is activated when the entry element 12 moves closer to the upper plate 16. The drawing also shows a display 34 that is used for displaying the entered characters which is encircled by a fixing frame 35.

The use of the described data entry device 10 is simple and its shape can be designed to meet the requirements of the intended use, and the designer has a substantial freedom to define the range of displacements and the displacement path. It should be noted that the surface of the entry element 12 need not be planar but it can fit to the shape of the thumb or finger that controls the movement, and respective devices can be made for left and right handed subjects.

Figure 18:
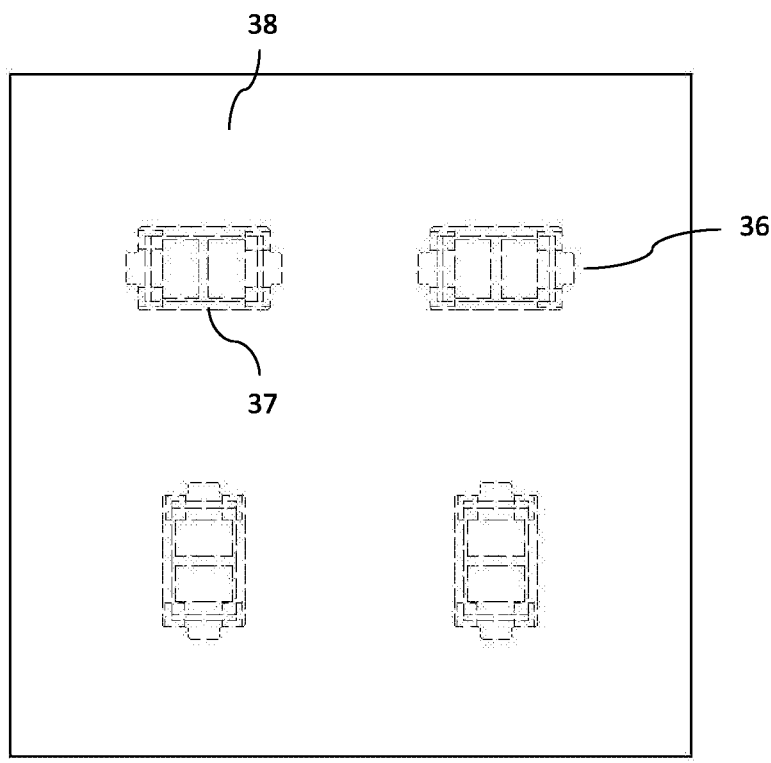
FIG. 18 shows schematically a detail of an embodiment of the displacement sensor 38.

For converting displacements along a limited path into electronic signals several ways are known. The displacement can be sensed as it is customary at movement sensing in touch screens or by capacitance sensing or by any other way. FIG. 18 shows the schematic layout of a preferred embodiment of a displacement sensor 38 that is arranged in the interior of the device and senses displacement between a stationary plate surface and the upper plate 16 with controlled movement. On the stationary plate two pairs of elongated and rounded sensing surfaces i.e. sensors 36 have been provided and in opposite position on the moving plate fields 37 were made which are illustrated by a dashed line. The sensors 36 are opto-electric transducers that sense the reflection of the position-dependent patterns above them. In this way the displacement of the moving plate can be converted into a series of electrical signals.

Figures 20, 20A:
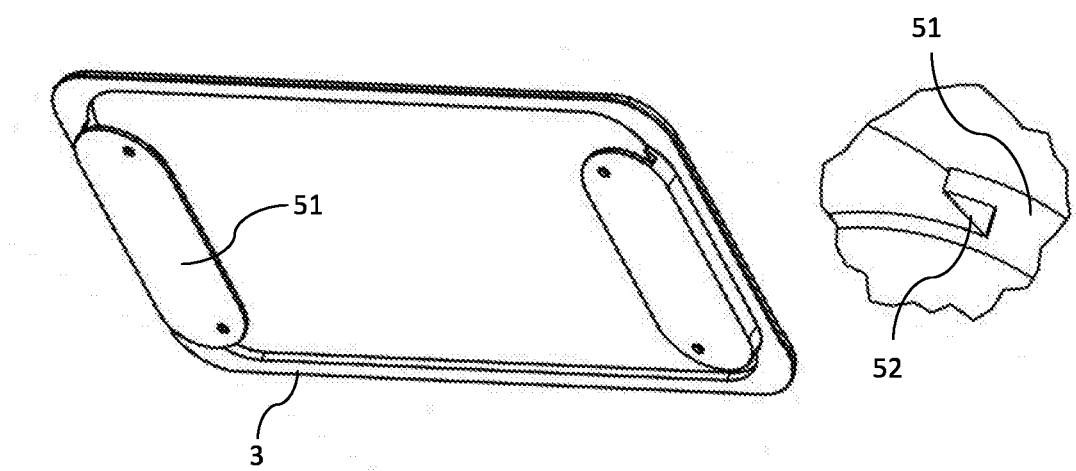
FIG. 20 shows the bottom view of the entry element 3 of the embodiment of FIG. 19.
FIG. 20A is an enlarged view showing the indicated detail of FIG. 20.
Figure 19:
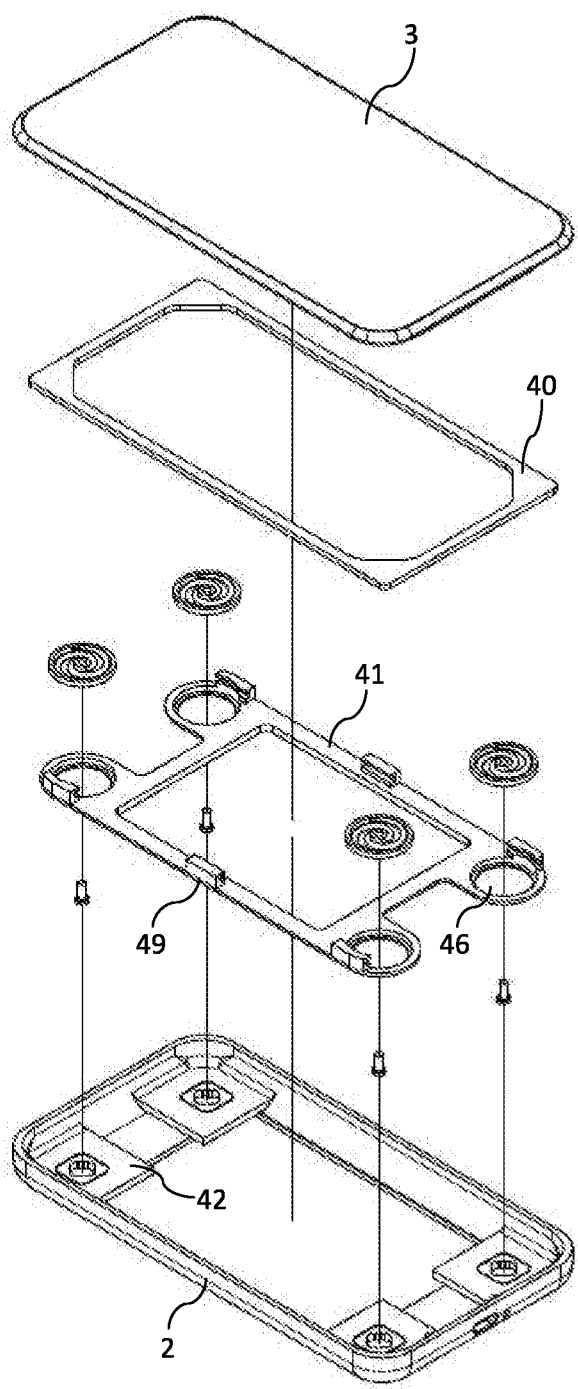
FIG. 19 shows the exploded view of an embodiment of the data entry device built together with a mobile phone.

In FIGS. 19 and 20 an example has been provided for the realization of the data entry device 1 as shown in FIG. 1, in which the data entry device 1 has been built together with a mobile phone. In FIG. 1 it can be observed that the entry element 13 covers almost the whole upper surface of the rectangular body 2 of the data entry device 1 which includes the touch screen required for mobile phone applications. FIG. 19 shows the simplified exploded view of the mechanical and supporting parts of such an embodiment, in which the parts which are fitted into each other are shown at a distance above each other. The uppermost part is the entry element 3 that covers the upper surface of the device and its major part is constituted by a touch screen which is used for mobile phone applications and not shown separately in FIG. 19. Under the entry element 3 a central member 40 is arranged that has the task of guiding the entry element 3 for linear movements in transverse direction which is parallel to the short side of the rectangle. At the same time the central member 40 can also move in parallel with the long side of the rectangle, and this longitudinal guiding is provided by a stationary flat guiding member 41 located under it. The guiding member 41 is arranged in the rectangular interior recess of the body 2 of the data entry device.

Figure 19D:
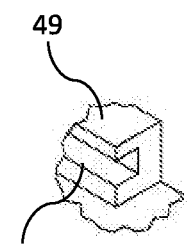
FIGS. 19A to 19D show respective enlarged details.

The data entry device 1 and its upper entry element 3 shown in FIGS. 19-20 have a large size compared to the size of the displacement, and it should be able to be moved by touching at any region of the large surface, and the required precise limited displacement cannot be easily controlled in a definite way if the movement is defined by a single guiding path only as shown in the previous embodiment. To that end in the interior of the body 2 at the four corner regions respective smaller rectangular guiding plates 42 are provided and in the central region of each four fully identical guiding paths 43 are provided. The design of the guiding plates 42 and of the guiding paths 43 can well be seen on the enlarged view of FIG. 19A. Concerning the design of the guiding paths 43 the same considerations apply as mentioned in connection with FIGS. 3 to 6. The difference lies only in that the guiding paths made on all the four guiding plates 42 are fully identical and equally positioned. In FIG. 19A two recesses 44 can be seen along the guiding path 43 which have the same task as the previously described recesses 8.

Figure 19C:
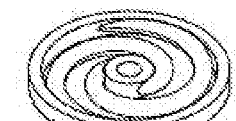
Figure 19B:
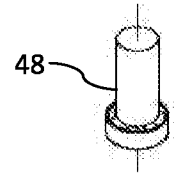
Figure 19A:
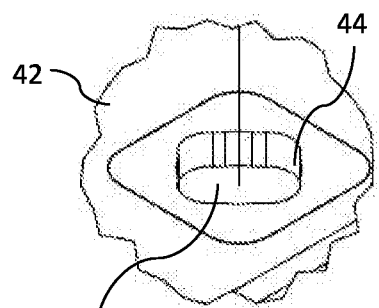

The guiding member 41 has respective projecting regions above the guiding plates 42 and guiding paths 43 in which respective circular nests 46 are provided to receive an associated spiral spring 47 which is shown in the enlarged view of FIG. 19C and has a flat spring body that fits in the associated nest 46. The interior of all spiral springs 47 surrounds a respective guiding pin 48 that has substantially the same task as the guiding pin 9 described at the previous embodiment, namely its movement is controlled by the entry element 3 to which it is affixed, and the four spiral springs 47 have the task to return the element in the central region of the opening defined by the guiding paths 43.

Of the two mutually normal linear guides the longitudinal one (which extends parallel to the long side of the rectangle) is ensured by guiding rails 49 made at both sides of the guiding member 41, and in the interior of the guiding rails 49 respective inwardly facing linear guiding slots 50 are provided that extend in longitudinal direction and can be seen in the enlarged view of FIG. 19D. The edges of the parallel longitudinal sides of the central member 40 are fitted in these guiding slots 50, whereby the central member 40 can be displaced in longitudinal direction and in a limited range relative to the guiding member 41.

The entry element 3 can move in transverse direction relative to the central member 40. FIG. 20 shows the entry element 3 from below, and to the two sides of its lower face a pair of transverse guiding rails 51 are fixed that have inwardly (i.e. towards each other) facing transverse slots 52, and the two short sides of the central member 40 are fitted in these transverse slots 52.

The possibility of displacing the so designed data entry device normal to the plane of the faceplate has not been shown in FIGS. 19 and 20 but it can be easily understood that between the guiding member 41 fixed in its plane and the body 2 a spring-biased displacement can be provided in normal direction to the faceplate that responds through a micro switch or a displacement sensor to such normal movements of the entry element 3.

Figure 21:
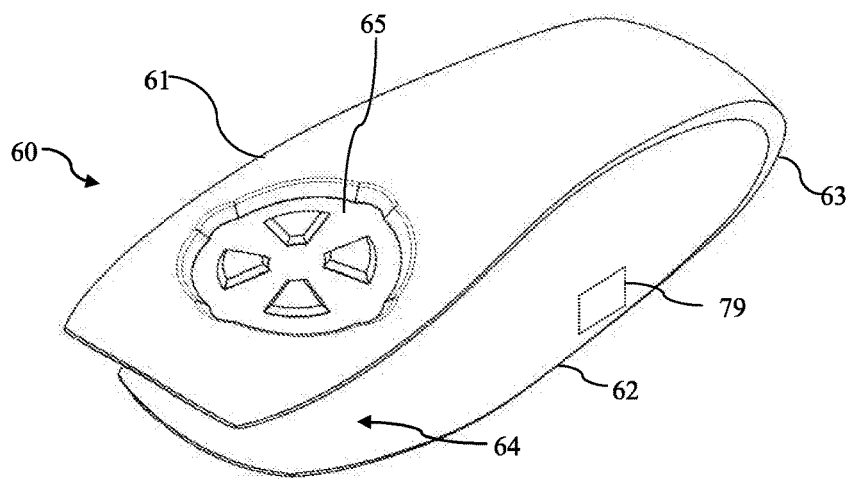
FIG. 21 shows the perspective view of a further alternative embodiment.
Figure 22:
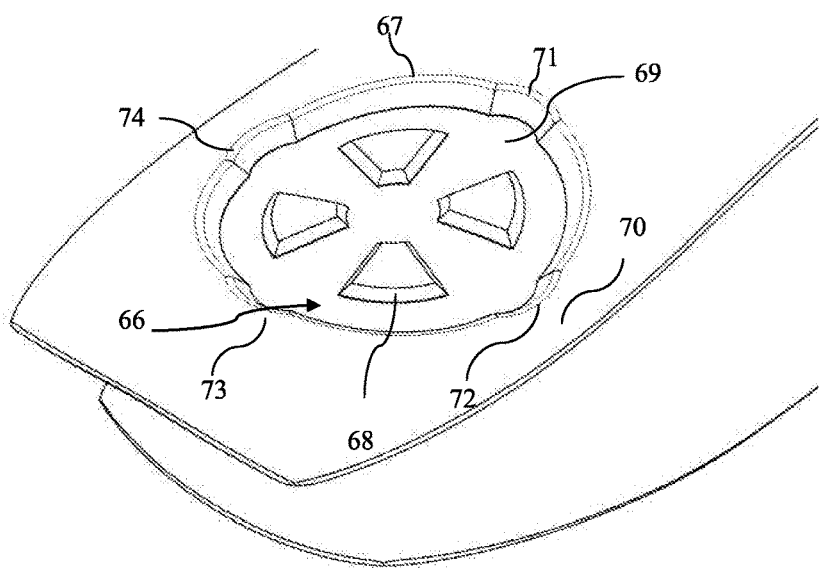
FIG. 22 shows an enlarged detail of FIG. 21.
Figure 23:
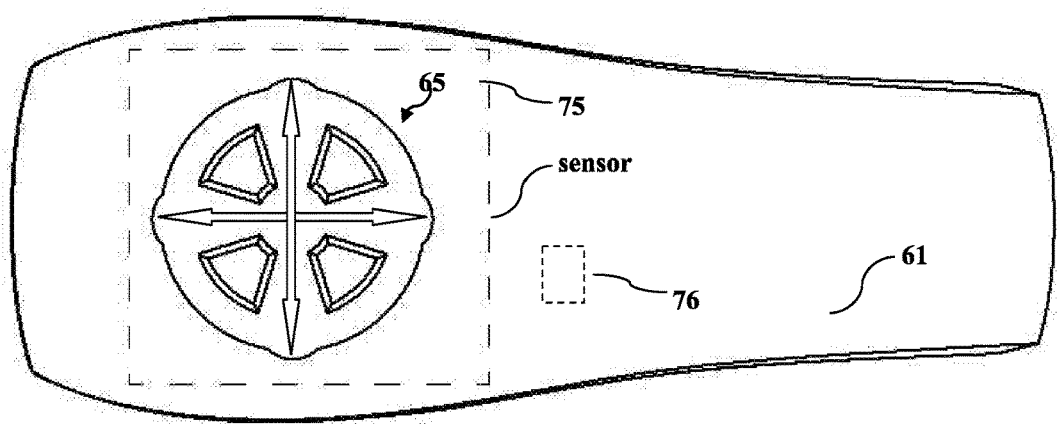
FIG. 23 shows the top view of the embodiment shown in FIG. 21.

Reference is made now to FIGS. 21 to 23 in which an embodiment illustrating the second way of data entry is shown, in which there is no movable separate data entry element but the finger movements are sensed on a designated touch-sensitive region on the surface of this data entry device. In FIG. 21 a specially designed data entry device 60 is shown, which has a curved shape that fits well to the palm of a human hand in which during use it is held. The device 60 has a curved body with respective upper and lower parts 61, 62 interconnected by an arced end portion 63. A gap 64 is formed between the outer portions of the upper and lower parts 61, 62. On the top of the upper part 61, where the body has about the maximum width a special data entry region 65 is provided. FIG. 22 shows the enlarged perspective view of the upper part 61 with the data entry region 65 thereon. The data entry region 65 has a central sunken area 66 encircled by a closed, preferably curved boundary 67 that has a role substantially corresponding to that of the guiding path 7 in the previous embodiment. The depth of the sunken area 66 is small, but sufficient to enable feeling the boundary 67 by the finger placed on the area 66. A plurality of regularly arranged isles 68 are made in predetermined different positions of the recessed area 66 that stand out from the plane of the sunk area 66 and their height is somewhat below the level of the outer surface of the upper part 61, but their projection is sufficient for the user to feel their presence and orientation when touching the area 66 by a finger that controls the data entry. In the illustrated embodiment four of such isles 68 are used, and each of them has a radially extending central symmetry axis. The central axes of opposite pairs of the isles lie on the same diagonal of the substantially circular boundary 67 which are mutually normal to each other, and they are inclined by 45° relative to the two main diagonals 69, 70 of the recessed area 66. The diagonal 69 extends in longitudinal direction of the device 66, and the diagonal 70 extends in transverse direction. The isles 68 are positioned in or close to the middle of the associated radius, and have arced inner and outer contours and straight sides as shown in FIG. 21. The curved line of the boundary 67 of the sunken area is slightly broken at the ends of the diagonals 69, 70 forming four arced recesses 71, 72, 73 and 74 which have similar function to the recesses 8 of the previous embodiment.

FIG. 23 shows the top view of the upper part 61 of the device 60 with the sunken data entry region 65. Under this region 65 in the interior of the body of the device a touch senor 75 is arranged, which is shown by dashed lines on FIG. 23 and it has a task similar to its task in touch screens to sense the location of the touch by the finger of the user. The area of the touch sensor 75 is preferably larger than the region 65 above it, so that there remains a sufficient surface area on the surface of the upper part 61 which can be assigned to different functions when such areas or regions are touched.

The operation of this embodiment is similar to that of the previous one, but the difference lies in that the data entry region 65 is stationary. When the user places one of his fingers (forefinger or thumb) on the region 65, he will feel the position and location of the four isles 68, and he can thereafter move his finger in accordance with the previously learned association rules between the respective combinations of elementary movements and the data to be entered. The user can move his finger in any of the four directions along the diagonals 69, 70 in the channels formed between the isles 68, and when reaching the end of a diagonal is feed back to him by sensing the presence of the associated one of the four recesses 71 to 74. Then he can choose in which direction he wishes to move on and feels not only the boundary 67 as a guiding path, but the finger senses the channel formed between the outer edges of the isles 68 and the boundary 67. This feeling is more definite as if he would feel only the edge of the boundary line 67, and the presence of the guiding channels assist the user in more definitely sensing where his finger moves. The movement continues along a channel portion until it arrives to the next one of the recesses. The haptic feedback provides a perfect orientation on the actual position. For further supporting the haptic feedback, in a further preferred embodiment, a small vibrator 76 can be arranged in the interior of the device, and it is activated when the finger arrives at one of the recesses 71 to 74. The vibration generated thereby should be very weak, it should be sufficient only for providing a further haptic signal to the user that the finger is at a special position.

In this embodiment substantially the same associations can be assigned between the elementary movement combinations and the characters/functions to be entered as in the previous embodiments. A substantial difference lies in that when the finger is raised, there is nothing to return to the central position, therefore the central channels between the isles 68 can be used as triggering different functions. In FIG. 23 respective arrows 77, 78 are shown along the diagonals of the sunken area 66, and the finger can be moved along both of them in both directions. As the touch sensor is sensitive to directions, by moving the finger along any one of the arrows 77, 78 in any directions, four different functions can be assigned to such simple linear movements. That can be the change between characters and numbers or letters in upper or lower case or any other usually used function.

In FIGS. 21 to 23 the data entry device 60 has been shown without having a screen or touch screen. This is not an indispensable requirement, and the device can be equipped with a screen or built together with a mobile phone. The embodiment shown is intended primarily for use as a remote controller or to take the function of a remote keyboard for a palm top or a smart entertainment device, with which it is connected via a wireless communication. It is preferred if the text or data entered be displayed on the screen of the remote device. Without having a screen the device can be realized as a hand held mouse which is smaller than mobile phones and can better fit to the hand in which it is held.

In a preferable embodiment the device 60 can have a further useful function, namely the function of a mouse. When the user tries to compress the device by pressing the upper and lower parts 61, 62 together, then the gap 64 allows these two parts 61, 62 to move slightly closer to each other owing to the flexible and slightly resilient design of the device. This slight movement can be sensed by a separate movement sensor 79 (see FIG. 21) built in the interior of the device that triggers a signal equivalent with the clicking of a mouse. This clicking can also control the vibrator 76 to generate a haptic feedback that the click has taken place. Such a design has great advantage, namely there is no special position on the device where the mouse function can be used, since the two parts 61, 62 can be compressed anywhere.

The data entry device according to the invention can be realized in several forms, sizes other than shown in the exemplary embodiments and can be equipped with different electronic circuitry.

In case of mobile phone applications the data entry towards the phone as an intelligent device can be realized in a direct way. The device can also be used directly for the remote data entry of computers, laptops, tablets and similar devices or in given cases for the replacement of keyboards. The fields of application of the data entry device according to the invention are not limited to mobile phones and the device can be used for the intelligent control of smart electronic entertainment devices (like television sets, DVD players, electronic entertainment centers, digital receivers, set top boxes, etc.) and for carrying out the data entry tasks required for their operation. Such function gains increasing significance, because such devices allow in most cases internet access, and the use of the internet imposes high data entry requirements that can be satisfied by existing remote control devices only in rather difficult and uncomfortable ways. In case of need the present data entry device can be built together with the remote control units of such devices. The communication between the controlled device and the data entry device can be realized by any conventional wireless connection but the wired connection is also possible. The processor performance of modern electronic devices might enable in most of the cases that by downloading and appropriate application software the device understands the "language" of this date entry device, or in this data entry device an intelligent electronic system can be arranged that "translates" the electronic signals generated by the combinations of movements required for the data entry into standard character combinations. The described fields of applications are far from being exhaustive, since data entry tasks are required at almost each intelligent devices, equipments or machines.

The invention claimed is:

1. Method for the conversion of elementary finger movements and/or movement combinations of a user into respective characters and/or functions presented as electrical signals by using a hand held smart electronic device (1, 60), comprising the steps of:

associating respective ones of said elementary finger movements and/or combinations made by a finger of the user when touching an upper surface of the device with respective ones of said characters and/or functions prior to the beginning of said conversion step;

carrying out said elementary finger movements and/or combinations associated with each character and/or function what the user wishes to enter with the finger touching;

detecting said finger movements and/or combinations from the beginning of the movement of the touching finger until the finger is raised from the surface and regarding a session between the start of the movement till the raising of the finger from the surface as an entry step of a single character and/or function associated with the entered finger movements and/or combinations;

following the finger raising step carrying out the conversion of the previously entered elementary movement and/or movement combination into the associated character or function;

repeating the entering steps as long as the conversion of all required characters or functions have been completed, characterized in that in said entering step limiting the finger movements by a closed boundary (7, 67) around a data entry region acting as a guiding path for the finger, the data entry region (66) having a central part, and a plurality of spaced special positions (8, 71-74) being provided along the boundary (7, 67), wherein the boundary (7, 67) and the special positions (8, 71-74) are designed to provide a haptic feedback sensation for the user when the finger reaches any one of them distinguishable from the haptic sensation provided by the adjacent sections of the boundary (7, 67), wherein said elementary movements comprise either a movement of the finger from the central part to the boundary at one of the special positions (8, 71-74) or a movement between a special position (8, 71-74) to an adjacent special position (8, 71-74) along the boundary (7, 67) as a guiding path, wherein in said detection step the movement of the finger during the entry of a character or function is continuously sensed.

2. The method as claimed in claim 1, wherein the boundary (7, 67) has the shape of a circle or an ellipse, and said special positions (8, 71-74) fall to end points of a pair of mutually normal diagonals of the boundary (7, 67) in case of a circle and to the maximum and minimum axis of an ellipse.

3. The method as claimed in claim 1, wherein in said special positions respective recesses (8, 71-74) are provided in said boundary (7, 67) that generate said haptic feedback.

4. The method as claimed in claim 1, wherein providing a vibration when any of the special positions (8, 71-74) is touched by the finger by a vibrator (76) arranged in the device (1, 60).

5. The method as claimed in claim 1, wherein in said character/function entering step an entry element (3, 4) being moved by said finger, said entry element (3, 4) is positioned on and separated from a body (2) of said device (1) and being guided for limited movement relative to the body (2) within said data entry region along two mutually normal linear paths without being turned; moving said entry element (3, 4) after said finger raising step and prior to the next data entry step into a basic position located in the central part of said data entry region by a biasing means.

6. The method as claimed in claim 5, wherein said entry element (3, 4) can be pushed against a slight spring bias normal to the plane of the movement, and by sensing said pushing a new entry function can be entered.

7. Data entry device for carrying out the method as claimed in claim 5, comprising a body (2) an entry element (3) positioned at the outside of the body and movable relative to the body by means of a finger or the thumb, the entry element (3) being coupled to the body (2) and being guided for linear movement along two mutually normal axes without being turned and a displacement sensor (38) sensing displacement of the entry element and converting said displacement into electrical signals, characterized in that the displacement of said entry element (3) takes place in a single plane when characters are entered, and the displacement is limited by a guiding path (7, 43) encircling an inner area constituting said data entry region, and a bias element (28, 47) that keeps the entry element (3) in a central portion of said data entry region but allowing a resilient displacement thereof, and at spaced positions along the guiding path (3) special positions are arranged formed as recesses that slightly but in a sensible manner limit the displacement of the entry element (3) along said guiding path.

8. The data entry device as claimed in claim 7, wherein said entry element (3) can be moved also in a direction normal to said axes of said displacement, and between the body (2) and the entry element (3) a biasing element is arranged that provides a spring bias against the movement in said normal direction, and comprises a displacement sensor (38) sensing said displacement in normal direction and converting it into an electrical signal.

9. The data entry device as claimed in claim 8, wherein said body (2) is coupled to a base plate (14), and the base plate (14) is connected to an intermediate plate (15) that can be moved along a first one of said axes, and to a side of the intermediate plate (15) which is opposite to another side that faces towards the base plate (14) an upper plate (16) is connected which is guided for movement along the second one of said axes, and said entry element (3) is built together with said upper plate (16).

10. The data entry device as claimed in claim 9, wherein said entry element (3) is connected to a guiding pin (9, 48) extending towards the inside of said body and reaching at least to said inner area defined by said guiding path (7, 43), and said intermediate plate (15) defines an opening that allows a passage of said guiding pin (9, 48) therethrough, and said bias element being formed by a spring (28, 47) which is stationary relative to said body (2) and encircling and coupled to said guiding pin (9, 48).

11. The data entry device as claimed in claim 7, wherein having a substantially rectangular shape and being built together with a mobile phone, and said entry element (3) being face plate of said mobile phone, said body has a hollow interior in which when proceeding from below towards the face plate there are provided: a guiding member (41) connected to the body (2) that comprises guiding rails (49) at the upper side that provide a guiding in longitudinal direction of the rectangle and said guiding rails (49) define guiding slots (50), a flat intermediate element (40) guided in said guiding slots (50) for displacement in longitudinal direction, and the entry element (3) that forms the face plate is coupled to and guided by said intermediate element (40) and guided thereby for displacement in transverse direction, furthermore the body (2) has four corner regions each defining one of four identical guiding paths (43) and above said paths respective spiral springs (47) are arranged in respective openings of said guiding member (41), said spiral springs (47) have interiors connected to respective guiding pins (48) and bias them to central region of said inner areas, and the guiding pins (48) extend in an associated one of said guiding paths (43).

12. The method as claim 1, wherein said special positions are formed as outwardly extending recesses in the boundary (7, 67).

13. The method as claimed in claim 1, wherein the number of said special positions (8, 71-74) is at most four.

* * * * *